(12) United States Patent
Lazarini et al.

(10) Patent No.: US 9,834,961 B2
(45) Date of Patent: Dec. 5, 2017

(54) SYSTEM AND METHOD FOR CONTROLLING VEHICLE DOOR AND CLOSURE LOCKS

(71) Applicant: GM Global Technology Operations LLC, Detroit, MI (US)

(72) Inventors: Marcelo V. Lazarini, Clinton Township, MI (US); William Otto, Lake Orion, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 292 days.

(21) Appl. No.: 14/751,717

(22) Filed: Jun. 26, 2015

(65) Prior Publication Data

US 2016/0376818 A1    Dec. 29, 2016

(51) Int. Cl.
*G06F 7/00* (2006.01)
*E05B 77/48* (2014.01)
*B60R 25/24* (2013.01)

(52) U.S. Cl.
CPC .............. *E05B 77/48* (2013.01); *B60R 25/24* (2013.01)

(58) Field of Classification Search
CPC ................................ E05B 77/48; B60R 25/24
See application file for complete search history.

(56) References Cited

U.S. PATENT DOCUMENTS

2012/0007724 A1*  1/2012  Murakami ............. G08C 17/02
                                                       340/12.5
2015/0287256 A1* 10/2015  Davis ..................... G05B 19/02
                                                       340/5.25

* cited by examiner

*Primary Examiner* — Adam Alharbi
(74) *Attorney, Agent, or Firm* — Reising Ethington, P.C.

(57) ABSTRACT

A system and method for controlling vehicle locks is provided that enable control of both a vehicle door lock and a vehicle closure lock using a single multipurpose switch. The system includes a vehicle door lock, a vehicle closure lock, a momentary, multi-purpose switch, and a control module. The control module receives an input signal generated by actuation of the switch and determines an elapsed time between the actuation and release of the switch. The module generates a closure lock control signal if the elapsed time meets a predetermined requirement relative to a predetermined time. The closure lock control signal unlocks the closure lock. The module also generates a door lock control signal responsive to the input signal if one or more predetermined conditions are met. The door lock control signal switches the state of the door lock between locked and unlocked states.

20 Claims, 3 Drawing Sheets

SYSTEM AND METHOD FOR CONTROLLING VEHICLE DOOR AND CLOSURE LOCKS

FIELD

The present invention relates generally to a vehicle system. More specifically, the invention relates to a system and method for controlling vehicle door and closure locks that enable control of the locks using a single, multi-purpose switch.

BACKGROUND

Most modern vehicles include mechanisms within the vehicle to allow occupants to control a lock on a rear closure of the vehicle. The mechanism provides a convenience to the vehicle occupant in that, for example, the occupant can unlock the rear closure and provide access to the vehicle by another person located outside of the vehicle. Providing the mechanism increases the functionality of the vehicle and makes the vehicle more desirable to consumers. Providing the mechanism, however, also increases the part count, cost and complexity of the vehicle.

SUMMARY

According to one embodiment, there is provided a system for controlling vehicle locks that includes a vehicle door lock and a vehicle closure lock. The system further includes a momentary, multi-purpose switch and a control module. The control module is configured to receive an input signal generated by an actuation of the switch and determine, in response to the input signal, an elapsed time between the actuation of the switch and a release of the switch. The control module is further configured to generate a closure lock control signal if the elapsed time meets a predetermined requirement relative to a predetermined time. The closure lock control signal is configured to change a closure lock state of the closure lock from a closure locked state to a closure unlocked state. The control module is further configured to generate a door lock control signal responsive to the input signal if one or more predetermined conditions are met. The door lock control signal is configured to change a door lock state of the door lock from one of a door locked state and a door unlocked state to the other of the door locked state and the door unlocked state.

According to another embodiment, there is provided a method for controlling a vehicle door lock and a vehicle closure lock that includes the steps of comprising the steps of receiving an input signal generated by an actuation of a momentary, multi-purpose switch and determining, in response to the input signal, an elapsed time between the actuation of the switch and a release of the switch. The method further includes the step of generating a closure lock control signal if the elapsed time meets a predetermined requirement relative to a predetermined time. The closure lock control signal is configured to change a closure lock state of a vehicle closure lock from a closure locked state to a closure unlocked state. The method further includes the step of generating a door lock control signal responsive to the input signal if one or more predetermined conditions are met. The door lock control signal is configured to change a door lock state of a vehicle door lock from one of a door locked state and a door unlocked state to the other of the door locked state and the door unlocked state.

DRAWINGS

Preferred exemplary embodiments will hereinafter be described in conjunction with the appended drawings, wherein like designations denote like elements, and wherein.

DESCRIPTION

The system and method described herein may be used to control a plurality of vehicle locks from a single, multi-purpose switch and, in particular, the vehicle door lock and a closure lock such as a rear closure lock. According to an exemplary embodiment, the actuation and release of the switch, and the time between actuation and release, are used to control both the vehicle door and closure locks. As a result, the functionality of the vehicle and its desirability to consumers is increased without increasing the part count, cost or complexity of the vehicle.

Figure 1:
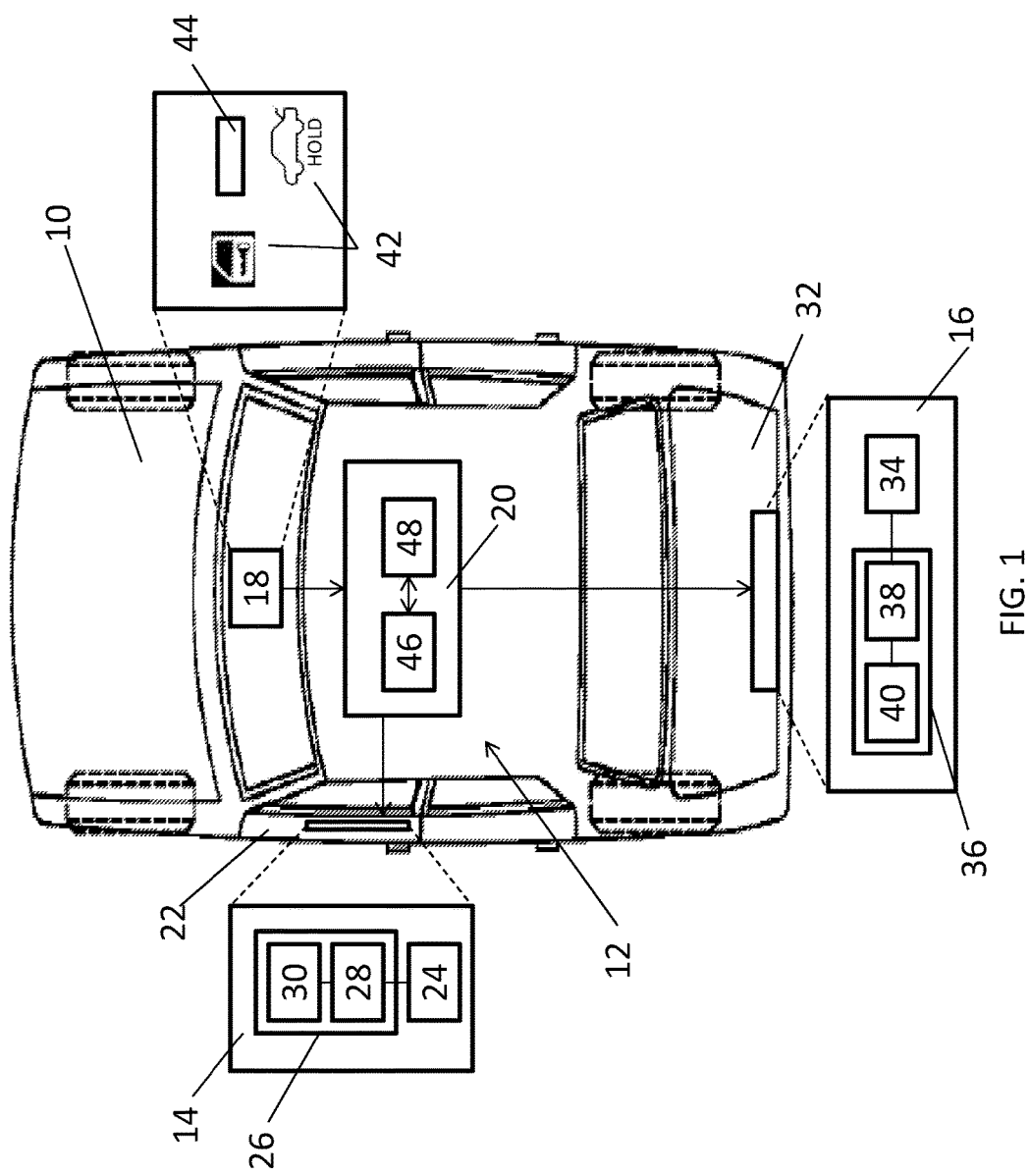
FIG. 1 is a schematic view of a vehicle including one embodiment of a system for controlling vehicle locks.

Referring now to the drawings wherein like reference numerals are used to identify identical components in the various views, FIG. 1 illustrates one embodiment of a vehicle 10 that may include a system 12 for controlling vehicle locks. In the illustrated embodiment, vehicle 10 comprises a sedan. It should be understood, however, that the system and method disclosed herein can be used with a wide variety of vehicles including coupes, wagons, hatchbacks, trucks, sport utility vehicles, crossover vehicles, vans, commercial vehicles and other vehicles. System 12 may include a door lock 14, a closure lock such as rear closure lock 16, a switch 18, and a control module 20 that controls locks 14, 16 responsive to switch 18.

Door lock 14 controls ingress to and egress from vehicle 10 through a vehicle door 22. Although only one door lock 14 is shown in the illustrated embodiment, it should be understood that similar door locks may be used on each door of the vehicle and that the door locks may be controlled together or independently by control module 20. Door lock 14 may include a latch 24 and an actuator 26.

Latch 24 is provided to maintain door 22 in a closed position preventing ingress to or egress from the body of vehicle 10. Latch 24 engages a striker (not shown) when door 22 is closed. Latch 24 may be disengaged from, and reengaged with, the striker using a variety of mechanical means such as external and internal door handles and electro-mechanical means such as actuator 26.

Actuator 26 is provided to control movement of latch 24 to engage and disengage the striker in order to unlock and lock door 22. Actuator 26 may include a rod 28 that engages latch 24 and a motor 30 configured to control movement of rod 28 responsive to signals from control module 20. The signals generated by control module 20 may be generated in response to signals from a power door lock interface, key fobs or from switch 18 as discussed hereinbelow. It should be understood that the particular construction of actuator 26 may vary.

Rear closure lock 16 controls ingress to and egress from the body of vehicle 10 or a compartment of vehicle 10 through a rear closure 32. In the illustrated embodiment, rear closure 32 comprises a trunk or deck lid that controls access to a trunk of vehicle 10. It should be understood, however, that rear closure lock 16 may be used to lock and unlock other types of rear closures including rear hatches, rear windows, and tailgates or liftgates. Further, although the illustrated closure lock comprises a rear closure lock 16, it should be understood that the system and method could be applied to other vehicle closure locks including closure locks controlling access to vehicle storage compartments such as a glove box closure lock or a center console closure lock. Rear closure lock 16 may similarly include a latch 34 and an actuator 36.

Latch 34 is provided to maintain rear closure 32 in a closed position preventing ingress to or egress from the body of vehicle 10 or a compartment within vehicle 10. Latch 34 again engages a striker (not shown) when rear closure 32 is closed. Latch 34 may be disengaged from, and reengaged with, the striker using a variety of mechanical means such as external and internal door handles and electro-mechanical means such as actuator 36.

Actuator 36 is provided to control movement of latch 34 to engage and disengage the striker in order to unlock and lock rear closure 32. Actuator 36 may include a rod 38 that engages latch 34 and a motor 40 configured to control movement of rod 38 responsive to signals from control module 20. The signals generated by control module 20 may again be generated in response to signals from a power door lock interface, key fobs or from switch 18 as discussed hereinbelow. It should be understood that the particular construction of actuator 36 may vary.

Switch 18 is provided to allow a vehicle occupant to control door lock 14 and rear closure lock 16. Switch 18 may be located in a variety of locations within vehicle 10 including on door 22, on a vehicle dashboard or instrument panel, on a center console or center stack, or on an overhead console. Switch 18 comprises a momentary switch. In the illustrated embodiment, switch 18 comprises a pushbutton switch. Switch 18 may, however, take on other forms including a rocker switch. In accordance with one aspect of the present teachings, switch 18 may comprise a single pole, single throw switch that can nevertheless be used as a multi-purpose switch controlling both door lock 14 and rear closure lock 16. Switch 18 may include indicia 42 providing instructions to the vehicle operator for use of switch 18 to control door lock 14 and rear closure lock 16. The indicia 42 may include words and/or drawings and other symbols. In the illustrated embodiment, the indicia 42 includes an image of a vehicle door with a key to indicate use of switch 18 to control door lock 14 and a image of a vehicle with an opened rear closure to indicate use of switch 18 to control rear closure lock 16. It should be understood that indicia 42 may vary for other closure locks. As discussed in greater detail hereinbelow, control of rear closure lock 16 or other closure locks may be dependent on the length of time switch 18 is actuated. Therefore, the indicia 42 may include wording (such as "HOLD") proximate the image of the vehicle with open rear closure to indicate to a vehicle occupant the need to maintain actuation of the switch 18 to control rear closure lock 16. Switch 18 may further include an indicator 44 of the state of door lock 14 and/or rear closure lock 16. In the illustrated embodiment, indicator 44 comprises a light and may comprise a light emitting diode (LED). The light may be turned on or off or project different colors to indicate the status of one of locks 14, 16. The light may also turn on or off or project colors in a pattern to indicate the status of one of locks 14, 16. In this manner, indicator 44 can be used to simultaneously indicate the status of both locks 14, 16 (e.g., by projecting a predetermined color to indicate the status of door lock 14 and flashing (or not flashing) to indicate the status of rear closure lock 16).

Control module 20 may be used to control, govern or otherwise manage certain operations or functions of vehicle 10 and, according to one exemplary embodiment, includes a processing device 46 and a memory device 48. Processing device 46 may include any type of suitable electronic processor (e.g., a microprocessor, a microcontroller, an application specific integrated circuit (ASIC), etc.) that executes instructions for software, firmware, programs, algorithms, scripts, etc. This processor is not limited to any one type of component or device. Memory device 48 may include any type of suitable electronic memory means and may store a variety of data and information. This includes, for example: look-up tables and other data structures; software, firmware, programs, algorithms, scripts, and other electronic instructions; component characteristics and background information; the current state of locks 14, 16, etc. Control module 20 may be electronically connected to other vehicle devices and modules via I/O devices and suitable connections, like a communications bus, so that they can interact as required. These are, of course, only some of the possible arrangements, functions and capabilities of control module 20, as others are certainly possible. Depending on the particular embodiment, control module 20 may be a stand-alone electronic module, it may be incorporated or included within another electronic module in the vehicle (e.g., a body control module, a generic electronic module, etc.), or it may be part of a larger network or system, to name a few possibilities.

Figure 2:
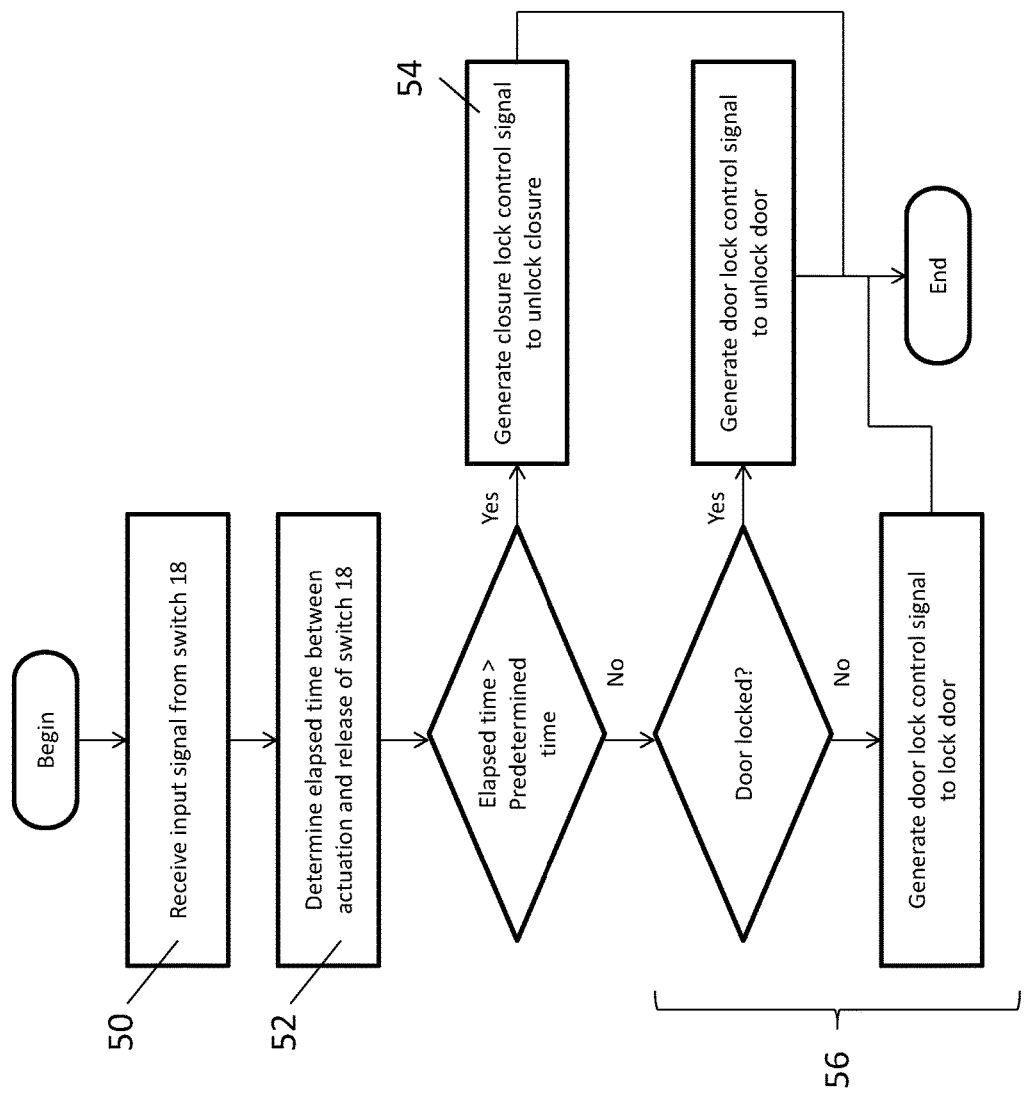
FIG. 2 is a flowchart illustrating one embodiment of a method for controlling a vehicle door lock and a vehicle closure lock; and, FIG. 3 is a flowchart illustrating another embodiment of a method for controlling a vehicle door lock and a vehicle closure lock.

In accordance with one embodiment control module 20 is configured with appropriate programming instructions or code (i.e., software) to perform several steps in a method for controlling vehicle door lock 14 and a closure lock such as rear closure lock 16. The code may be stored in memory device 48 of control module 20 and may be uploaded to memory device 48 from a conventional computer storage medium. Referring now to FIG. 2, the method may begin with the step 50 of receiving an input signal generated by actuation of switch 18. A vehicle occupant may actuate switch 18 by pressing switch 18 to close the switch contacts and generate a signal that is transmitted to and received by control module 20. In step 52, control module 20 determines, in response to the input signal, an elapsed time between actuation of switch 18 and release of switch 18. As discussed above, switch 18 is a momentary switch. When the vehicle occupant stops pressing switch 18 or otherwise actuating switch 18, the switch contacts are opened and the signal generated by switch 18 and transmitted to control module 20 is halted. Control module 20 may include a clock, counter or other conventional mechanism to determine the elapsed time between actuation of switch 18 and release of switch 18.

Module 20 may generate control signals to control door lock 14 or a closure lock such as rear closure lock 16 based on whether or not the elapsed time meets a predetermined requirement relative to a predetermined time. The predetermined requirement may, for example, comprise whether the elapsed time is less than, greater than or equal to a predetermined time. Thus, in step 54, module 20 may generate a closure lock signal if the elapsed time meets a predetermined requirement relative to the predetermined time. In one embodiment, for example, module 20 generates the closure lock signal if the elapsed time between actuation and release of switch 18 is greater than the predetermined time (e.g., two seconds). The closure lock signal is configured to change a state of rear closure lock 16 from a locked state to an unlocked state.

In step 56, module 20 may generate a door lock control signal if the elapsed time does not meet the predetermined requirement relative to the predetermined time. Thus, for example, module 20 generates the door lock control signal if the elapsed time between actuation and release of switch 18 is less than or equal to the predetermined time (e.g., two seconds). The door lock control signal is configured to change a state of door lock 14 from either the locked state to an unlocked state or from an unlocked state to a locked state. Thus, if door lock 14 is currently in a locked state, the door lock control signal is configured to change the state of door lock 14 to an unlocked state. If door lock 14 is currently in an unlocked state, the door lock control signal is configured to change the state of door lock 14 to a locked state. The elapsed time failing to meet the predetermined requirement relative to the predetermined time may be only one of several predetermined conditions that must be met for issuance of the door lock control signal. For example, when the door lock 14 is in a locked state, additional conditions may include that the vehicle is below a predetermined speed or is in park with the output of the vehicle transmission prevented from rotation.

Figure 3:
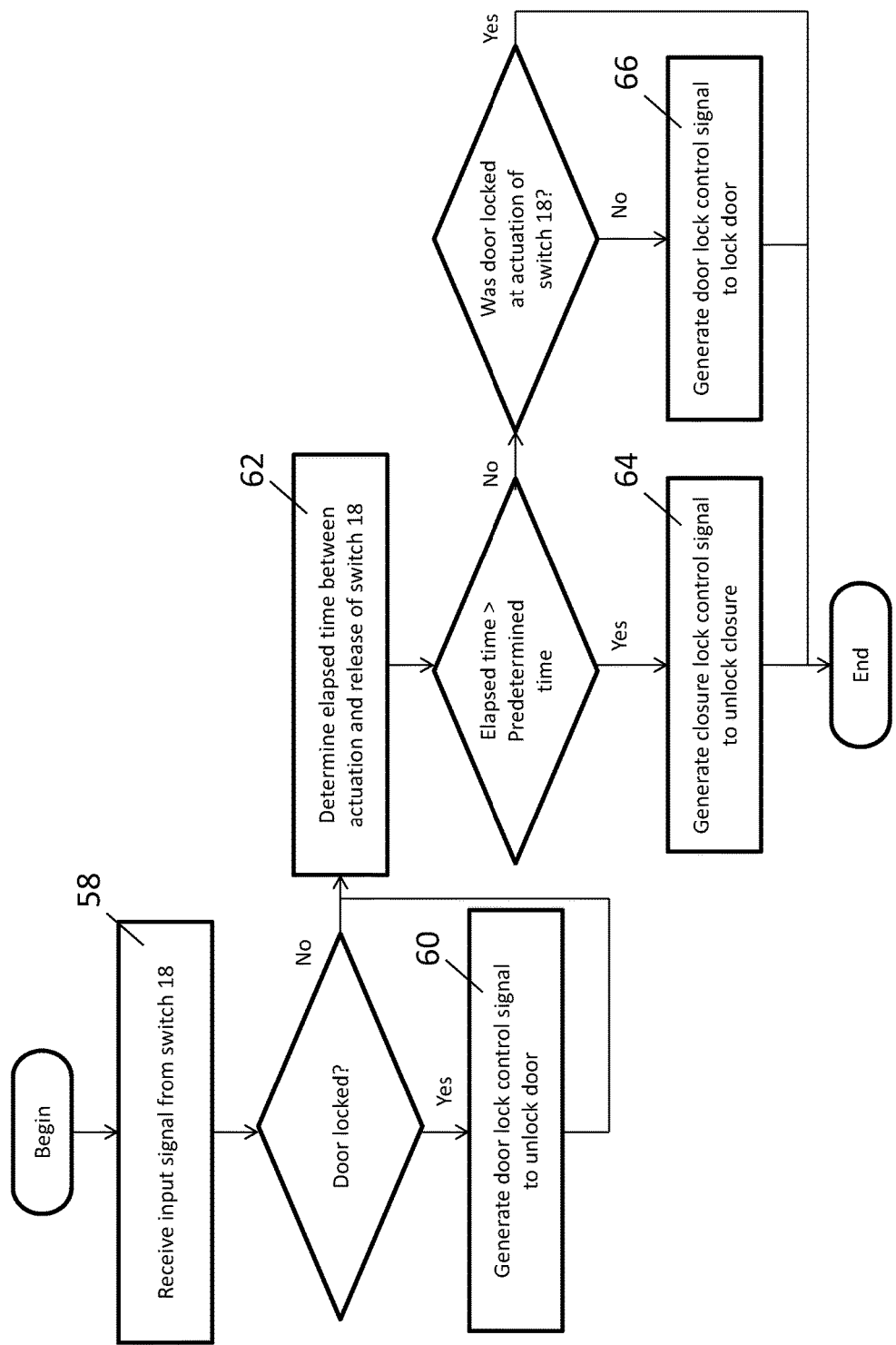

Referring now to FIG. 3, another embodiment of a method for controlling door lock 14 and a closure lock such as rear closure lock 16 is illustrated. The method shown in FIG. 3 differs from the method shown in FIG. 2 in that door lock control signals may be generated upon either actuation or release of switch 18 depending on the current state of door lock 14. The method may again begin with the step 58 of receiving an input signal generated by actuation of switch 18. A vehicle occupant may again actuate switch 18 by pressing switch 18 to close the switch contacts and generate a signal that is transmitted to and received by control module 20. If the door lock 14 is in locked state, control module 20 may, in step 60, generate a door lock control signal immediately upon actuation of switch 18. The door lock control signal is configured to change the state of door lock 14 from the locked state to an unlocked state. Because conventional door lock controls change the state of a door lock immediately upon request of the vehicle occupant, the method in FIG. 3 has the advantage of greater consistency with prior systems and consumer expectations. Further, typical automatic door locking algorithms will ultimately return door lock 14 to a locked state if unlocking was unintended.

In step 62, control module 20 determines, in response to the input signal, an elapsed time between actuation of switch 18 and release of switch 18. As discussed above, switch 18 is a momentary switch. When the vehicle occupant stops pressing switch 18 or otherwise actuating switch 18, the switch contacts are opened and the signal generated by switch 18 and transmitted to control module 20 is halted. Control module may include a clock, counter or other conventional mechanism to determine the elapsed time between actuation of switch 18 and release of switch 18.

Module 20 may again generate control signals to control door lock 14 or rear closure lock 16 based on whether or not the elapsed time meets a predetermined requirement relative to a predetermined time. The predetermined requirement may, for example, again comprise whether the elapsed time is less than, greater than or equal to a predetermined time. Thus, in step 64, module 20 may generate a closure lock signal if the elapsed time meets a predetermined requirement relative to the predetermined time. In one embodiment, for example, module 20 generates the closure lock signal if the elapsed time between actuation and release of switch 18 is greater than the predetermined time (e.g., two seconds). The closure lock signal is configured to change a state of rear closure lock 16 from a locked state to an unlocked state.

In step 66, module 20 may generate a door lock control signal if the elapsed time does not meet the predetermined requirement relative to the predetermined time. Thus, for example, module 20 generates the door lock control signal if the elapsed time between actuation and release of switch 18 is less than or equal to the predetermined time (e.g., two seconds). In the method embodiment shown in FIG. 3, the door lock control signal generated in step 66 is configured to change a state of door lock 14 from an unlocked state to a locked state. Therefore, the elapsed time failing to meet the predetermined requirement relative to the predetermined time is only one of several predetermined conditions that must be met for issuance of the door lock control signal in step 66. In particular, the door lock 14 must also be in an unlocked state at the time switch 18 was first actuated. Further, it should again be understood that other conditions may also exist for issuance of the various door lock control signals by control module 20. As noted above, conventional door lock controls change the state of a door lock immediately upon request of the vehicle occupant. Although the door lock control signal in step 66 is generated only after release of switch 18 (if certain predetermined conditions are met), this delay is unlikely to cause issues with consumer expectations because consumers rarely use conventional door lock controls to lock vehicle doors due to the presence of automatic door locking algorithms employed in conventional vehicles.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A system for controlling vehicle locks, comprising:
a vehicle door lock;
a vehicle closure lock;
a momentary, multi-purpose switch and,
a control module configured to
receive an input signal generated by an actuation of said switch;

determine, in response to the input signal, an elapsed time between the actuation of the switch and a release of the switch;

generate a closure lock control signal if the elapsed time meets a predetermined requirement relative to a predetermined time, the closure lock control signal configured to change a closure lock state of said closure lock from a closure locked state to a closure unlocked state; and, generate a door lock control signal responsive to said input signal if one or more predetermined conditions are met, said door lock control signal configured to change a door lock state of said door lock to a door locked state when said door lock is in a door unlocked state and to said door unlocked state when said door lock is in a door locked state.

2. The system of claim 1 wherein the one or more predetermined conditions comprises a first predetermined condition that the elapsed time does not meet the predetermined requirement.

3. The system of claim 2 wherein the one or more predetermined conditions comprise a second predetermined condition that the door lock state of said door lock is the unlocked door state.

4. The system of claim 1 wherein the one or more predetermined conditions comprises a first predetermined condition that the door lock state of the door lock is in the door locked state.

5. The system of claim 1 wherein the predetermined requirement is that the elapsed time is greater than the predetermined time.

6. The system of claim 1 wherein the momentary switch comprises a single pole, single throw switch.

7. The system of claim 6 wherein the momentary switch comprises a pushbutton switch.

8. The system of claim 1 wherein the switch includes an indicator of the door lock state of the door lock.

9. The system of claim 8 wherein the indicator indicates the closure lock state of the closure lock.

10. The system of claim 1 wherein the vehicle closure lock comprises a vehicle rear closure lock.

11. A method for controlling a vehicle door lock and a vehicle closure lock, comprising the steps of:

receiving an input signal generated by an actuation of a momentary, multi-purpose switch;

determining, in response to the input signal, an elapsed time between the actuation of the switch and a release of the switch;

generating a closure lock control signal if the elapsed time meets a predetermined requirement relative to a predetermined time, the closure lock control signal configured to change a closure lock state of a vehicle closure lock from a closure locked state to a closure unlocked state; and, generating a door lock control signal responsive to said input signal if one or more predetermined conditions are met, said door lock control signal configured to change a door lock state of a vehicle door lock to a door locked state when said door lock is in a door unlocked state and to said door unlocked state when said door lock is in a door locked state.

12. The method of claim 11 wherein the one or more predetermined conditions comprises a first predetermined condition that the elapsed time does not meet the predetermined requirement.

13. The method of claim 12 wherein the one or more predetermined conditions comprise a second predetermined condition that the door lock state of said door lock is the unlocked door state.

14. The method of claim 11 wherein the one or more predetermined conditions comprises a first predetermined condition that the door lock state of the door lock is in the door locked state.

15. The method of claim 11 wherein the predetermined requirement is that the elapsed time is greater than the predetermined time.

16. The method of claim 11 wherein the momentary switch comprises a single pole, single throw switch.

17. The method of claim 16 wherein the momentary switch comprises a pushbutton switch.

18. The method of claim 11 wherein the switch includes an indicator of the door lock state of the door lock.

19. The method of claim 18 wherein the indicator indicates the closure lock state of the closure lock.

20. The method of claim 11 wherein the vehicle closure lock comprises a vehicle rear closure lock.

\* \* \* \* \*